United States Patent [19]

Huffman et al.

[11] Patent Number: 4,631,719
[45] Date of Patent: Dec. 23, 1986

[54] CHANNEL LOOPING APPARATUS FOR FAILURE ANALYSIS

[75] Inventors: Charles E. Huffman, Plano; Paul E. Pepmiller, Richardson, both of Tex.

[73] Assignee: Rockwell International Corporation, El Segundo, Calif.

[21] Appl. No.: 599,872

[22] Filed: Apr. 13, 1984

[51] Int. Cl.⁴ .............................. H04J 1/16; H04J 3/14
[52] U.S. Cl. .......................................... 370/15; 371/8; 371/22; 371/71
[58] Field of Search ................. 370/15, 16, 17; 371/8, 371/22, 24, 71

[56] References Cited

U.S. PATENT DOCUMENTS 4,112,414  9/1978  Iscol et al. .............................. 371/22
4,376,999  3/1983  Abbott et al. .......................... 371/71

FOREIGN PATENT DOCUMENTS 2626838  12/1976  Fed. Rep. of Germany .......... 371/8
2252711   6/1975  France ................................... 370/15
 752837   8/1980  U.S.S.R. ................................. 371/8

OTHER PUBLICATIONS

Bodart et al.-Code and Speed Dependent TDM-Phillips Telecomm. Review-vol. 36, No. 4, Nov. 1978, pp. 197-209.

Primary Examiner—Joseph A. Orsino, Jr.
Attorney, Agent, or Firm—Bruce C. Lutz; V. Lawrence Sewell; H. Fredrick Hamann

[57] ABSTRACT

When a digital muldem employs protective switching, a requirement exists to perform revertive switching. The present disclosure illustrates a way to test the failed module after a switch to determine whether the module is actually failed or the decision to switch was based on momentary external conditions. The test is accomplished by looping back the "failed" module, passing data from one of the operative channels through the "failed" module and doing a bit by bit compare of input and output data for identity. If all of the muldems convert signals to a common frequency, only a single compare circuit need be used on a multiplexed basis.

7 Claims, 6 Drawing Figures

CHANNEL LOOPING APPARATUS FOR FAILURE ANALYSIS

THE INVENTION

The present invention is directed generally to electronics and more specifically to a set of muldem modules in a switching network. Even more specifically, the present invention is related to reestablishing the use of supposedly failed modules so that the "failed" modules can be returned to service.

BACKGROUND

Prior art muldems have been designed for converting between DS3 (approximately 44 megahertz) transmission line signals and one or more of the lower frequency transmission line signals such as DS2 (approximately 6 megahertz), DS1 (approximately 1.5 megahertz) and DS1C (approximately 3 megahertz). In these system concepts, there is always the need for some type of redundancy in the event that one or more parts in the muldem fails. One method is complete redundancy so that any path can be switched into operation as a replacement for the failed component. However, in view of the costs of complete redundancy, especially where there are many demultiplexer, multiplexer and switch modules, etc., of each given type in a box, a single standby unit or module for each type of operational module is used and when an operational module fails or provides an indication of failure, the standby identical module is switched into operation.

It has been found that quite often the apparent failure is merely due to momentary external conditions and the "failed" module is actually operating properly. Thus, there is a requirement that the "failed" module be tested to determine whether the module actually failed or the decision to switch was based on the momentary external conditions. If it is found that the module has not failed, then it is desirable to return operation to normal conditions so that the standby module can be utilized to replace other modules believed to have failed. Otherwise, the spare module would not be available for a true failure.

As a consequence of having standby modules, it is necessary for proper operation of the system to periodically test the standby modules to insure that they are actually available for service. Thus, a properly designed digital muldem provides means of testing both the failed modules and the standby modules used to design the system.

Prior art test devices have used a pseudorandom generator to generate a data stream that is passed through the module being tested and the output of the module is checked to see whether or not the data is passed in a standardized manner. It has been found that a pseudorandom pattern of data does not necessarily generate the same failure mode as does true data. In other words, a module can test operational with a given pseudorandom data pattern and still not pass data, in some other data stream configuration, correctly.

The present invention illustrates a design method for constructing the digital muldem wherein the muldem is designed in two separate stages. The low speed muldem portion provides circuitry to convert the low speed customer interface whether it be DS1, DS1C or DS2 signals through an appropriate plurality of muldems to a common intermediate speed or data occurrence frequency. The signals are then switched or routed to a high speed muldem or its spare which converts from the common frequency to the DS3 frequency while multiplexing the data. In the present invention, economies have been realized by making the common frequency signal the same as the DS2 frequency and format. The low speed muldem spares can be used to replace any one of the identical type (DS1, DS1C or DS2) operational low speed muldems.

In the present invention, data from a low speed active circuit is applied to a failed module for multiplexing as if the failed module were operational, as well as to the spare or other active module. However, the output of the failed module is rerouted from the output of the demultiplexer to the input of the multiplexer in a loopback configuration. (This loopback is from multiplexer to demultiplexer in the high speed circuit modules.) The circuitry for providing the loopback disconnects the failed module from the customer circuitry and thus the customer is isolated from the failed module. Since the demultiplexing and multiplexing of the signal in the loopback configuration produces identical data supplied to and received from the looped-back module in a correctly operating module, a comparator can be used to compare, on a bit by bit basis, the signals input to and output from the failed module thereby ascertaining whether or not the module has actually failed, or the apparent failure, as previously detected, was merely due to some momentary external condition. The same approach can be used for testing the high speed muldem and any of the spares since all of these units have a common frequency, a single comparator circuit can be used to test all of the muldems regardless of their multiplexing frequency.

It is thus an object of the present invention concept to illustrate a method for testing muldems for operability in a muldem switching system.

Another object of the present invention is to present a method whereby a muldem can be designed to simplify the circuitry required by eliminating one or more pseudorandom generators and using, instead, actual data for testing. The invention also includes using a common intermediate frequency in the apparatus so that testing of all of the different frequency muldems can be accomplished using a single test (bit comparator) device.

Other objects and advantages of the present inventive concept will be apparent from a reading of the specification and appended claims in conjunction with the drawings wherein:

DETAILED DESCRIPTION

Figure 1:
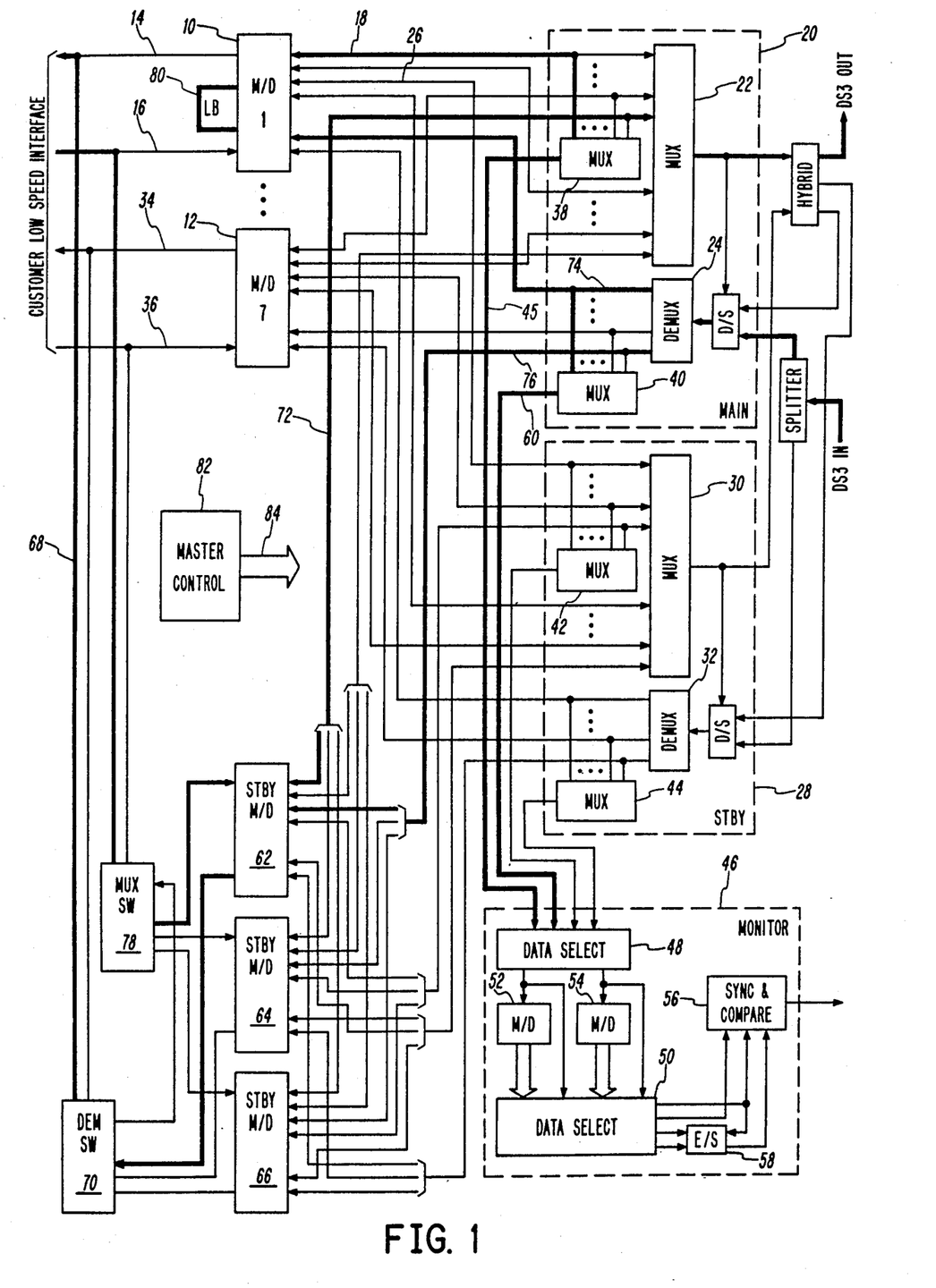
FIG. 1 is a block diagram of a muldem designed in accordance with the inventive concept which illustrates the circuit connections used in testing a failed low speed muldem group or module after a switch has been made to a low speed standby module.

FIG. 1 illustrates one embodiment of a muldem wherein there are seven groups of low speed muldems, a first group which is labeled 10 and a number of dots between it and the last group which is labeled 12. The group muldems 10 through 12 are connected to customer low speed transmission lines and may be in one embodiment any of DS1, DS1C and DS2 formatted signals. If muldem 10 is configured to have DS1 outputs, the lines or leads indicated as 14 and 16 will have four pairs of signals each operating at 1.544 megahertz. Signals received from the customer on line 16 are multiplexed to a 6.312 megahertz common frequency DS2 format signal within block 10 and are output on lead 18 for application to a high level multiplex block, high speed muldem, or high speed module generally designated as 20 and containing a multiplexer block 22 and a demultiplexer block 24. This data is also supplied on a standby lead 26 to a standby high speed muldem 28 which contains blocks similar to that of 20 and more specifically contains a multiplexing block 30 and a demultiplexing block 32. It may be assumed that the low speed module 12 is connected to DS2 customer transmission lines and thus a lead 34 is a single line supplying DS2 formatted signals to the customer and line 36 is receiving DS2 formatted signals from the customer. In this event, module 12 rather than doing multiplexing and demultiplexing is merely desynchronizing signals as received from the high speed muldem 20 or standby high speed muldem 28 to the customer's frequency or synchronizing signals received from the customer to the frequency of operation of the output high speed muldem. If one of the muldems in the low speed group is receiving DS1C signals, it must first strip the overhead bits from these signals, divide the data signal into DS1 format signals and then recombine these signals to DS2 before outputting same to the high speed output muldems.

As will be observed, each of the multiplex and demultiplex portions of the high speed muldems has a block MUX which accomplishes a ten to one multiplexing or data selection action. The ten to one MUX for multiplexer 22 is given the designation of 38 while the one for demultiplex block 24 is given the designation 40. A similar set of MUX'es 42 and 44 are illustrated within standby muldem 28. The multiplexer 38 is connected to each of the incoming lines for multiplexer 28 and also supplies signals to a monitor 46. Within monitor 46 is a data select block 48. The block 48 supplies signals to a further data select block 50 after the data is passed through to DS2 muldems 52 and 54 labeled as shown. The output of data select block 50 is passed to a sync and compare block 56 directly for the data of one received data stream and through an elastic store 58 for the other data stream. The ten to one multiplex unit 40 is connected in similar fashion for data received from the DS3 transmission line so that the unit 40 can retrieve any single one of the sets of received data and output same on a lead 60 to the monitor 46. As shown, each of the high speed muldems 20 and 28 not only have outputs connected to each of the main groups of operational low speed muldems but also additional leads for connection to each one of the standby muldems. The standby muldems are designated as 62, 64 and 66. The standby unit 62, in one embodiment of the inventive concept, was a standby unit for DS1 signals, muldem 64 is a standby unit for DS1C signals while unit 66 is merely a resynchronizing standby unit to resynchronize DS2 signals between the customer and the high speed muldem.

As drawn, FIG. 1 assumes a failure of the DS1 muldem 10 and thus the standby muldem 62 has been switched into operation. The customer output signal on lead 14 is now supplied via another path through the muldem. The signal on lead 16 destined for demultiplexer block 24 is sent to standby muldem 62. The output of standby muldem 62 is routed through demultiplexing switch 70 to lead 68 and finally sent to the customer on lead 14. A circuit not specifically shown in FIG. 1 but located internal block 10 is switched as will be later described in FIG. 4 to produce a loopback connection designated as 80. Finally, a master control block 82 is illustrated with a plurality of output leads 84 which is used to control the switching within many of the various blocks including each of the muldems and the multiplex units 38, 40, 42 and 44 wherein the proper frequency signals are always routed to the muldems designed to handle those signals whether they be standby or original muldems.

Figure 2:
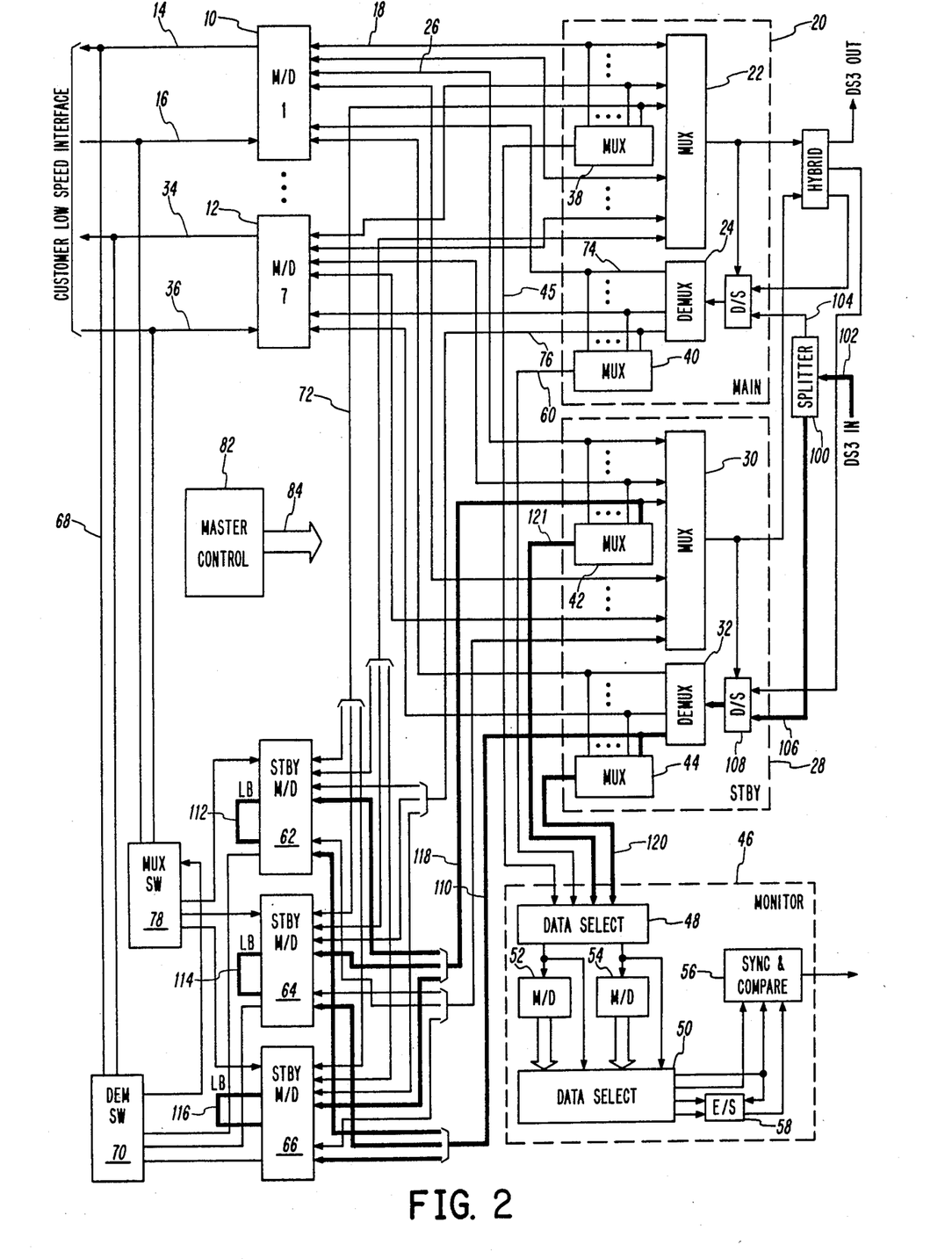
FIG. 2 is a block diagram similar to that of FIG. 1 showing the connections involved in the switching circuit for providing a test of the operability of the standby modules whether they be the high speed or low speed group modules.

FIG. 2 uses the same designators as used in FIG. 1 but for the purposes of illustration adds a few more designators to facilitate description of operation. As illustrated, a splitter 100 splits the signals incoming to the muldem between muldems 20 and 28 so that signals incoming on lead 102 are split to output leads 104 and 106. The signals on lead 106 are passed to a three input data select block 108 before being supplied to demultiplex unit 32 within block 28. The output of demultiplex unit 32 is supplied on the darkened output leads, as shown, to a lead 110 where they are selectively input to the standby muldems 62, 64 and 66. As shown, the muldem 62 has a loopback connection 112 while muldem 64 has a loopback connection 114 and muldem or interface means 66 has a loopback connection 116. The outputs of each of these muldems 62 through 66 are selectively supplied to a lead 118 and thence to the MUX 42 as well as to multiplex unit 30. These signals are selectively output from multiplex unit 42 on a lead 121 to the data select unit 48. The signals originally input to standby MUX 28 which were output to lead 110 are also supplied to multiplex unit 44 which selectively outputs the signals on a lead 120 to a further input of data select unit 48.

FIG. 3 again uses the same numbers as used in FIG. 1 with a single additional designator 124 for the loopback connection within muldem 20 between multiplex unit 22 and demultiplex unit 24.

Figure 4:
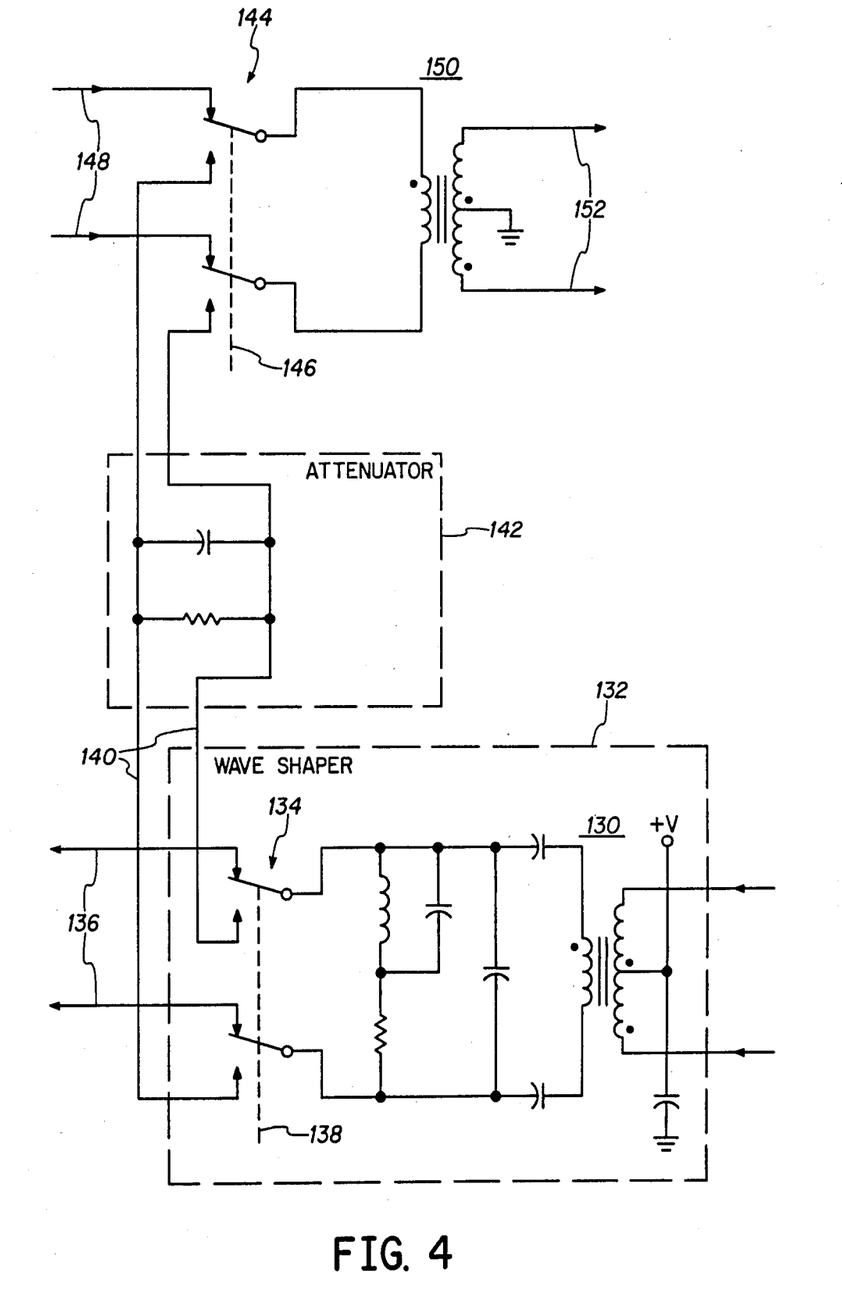
FIG. 4 is a circuit diagram illustrating the circuitry utilized in performing a loopback connection of a low speed muldem.

FIG. 4 illustrates a loopback connection circuit such as may be used for loopback 80 of FIG. 1 where signals are received from the muldem by a transformer 130 within the waveshaper block 132 and transmitted to a set of switches generally designated as 134. Normally, the signals input by waveshaper 132 are output on a set of leads 136. However, if the switches, through the use of the control input 138, are operated, the signals will be instead passed to the pair of leads output from waveshaper 132 as leads 140 to the attenuator block 142. The attenuator 142 reduces the magnitude of the signals and supplies them to a further set of switches generally designated as 144 and operated by a control input 146.

Normally, signals come in from a customer on a set of leads 148 and are passed through the switch contacts 144 to a transformer 150 for supply on the set of output leads 152 to the MUX within muldem 10. However, if the control signals are applied to inputs 138 and 146, the contacts within relay 144 are altered and the signals from attenuator 142 are passed to transformer 150 and output on leads 152.

Figure 5:
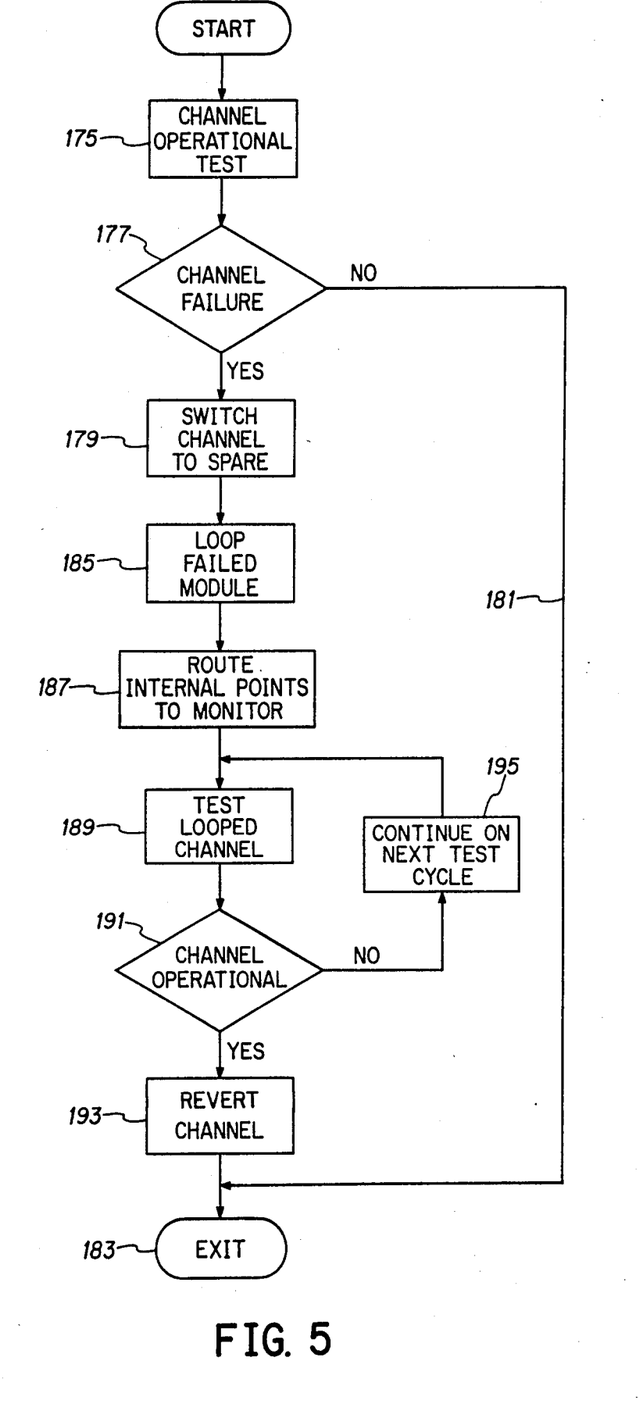
FIG. 5 is a flow diagram illustrating the steps involved in a test sequence for testing each data channel not passing data.

In FIG. 5 a flow diagram is illustrated of a test sequence for checking each individual channel module not presently passing data to see whether it is still in a failed condition. This test sequence is performed periodically until there is some assurance that the channel module (previously assumed to have failed) is operating properly and the standby muldem can be removed from temporary operation and the "failed" channel module can be reinserted as an operating unit. As illustrated, the sequence starts the channel module operational test via block 175. The decision block 177 makes a determination as to whether or not the channel module is still in a failed condition through a loopback test and the comparison test to be later described. If the channel module is in a failed condition, the procedure goes to block 179. However, typically, the channel module will not be in a failed condition and the decision will travel via decision line 181 to an exit point 183 and test a further signal channel. If the decision has been made that the channel module has failed either momentarily or permanently, the signal is switched to a spare muldem by block 179 and the failed module is looped via procedures in block 185. Internal data points are then routed to a test monitor as illustrated in block 187 so that the signal channel can be looped through the failed module and tested as indicated in block 189. If the channel module is operational at this time, the decision block 191 allows for passage to block 193 where the reversion takes places and the original module is reinserted into the data transmission path and the standby module is released for further potential use for a later failed channel module. If, however, the signal channel is not operational, the sequence goes to a block 195 where the procedure starts at a later periodic interval of testing channels to see if, at that later time, with the channel still looped around the module, the module is then operational.

Figure 6:
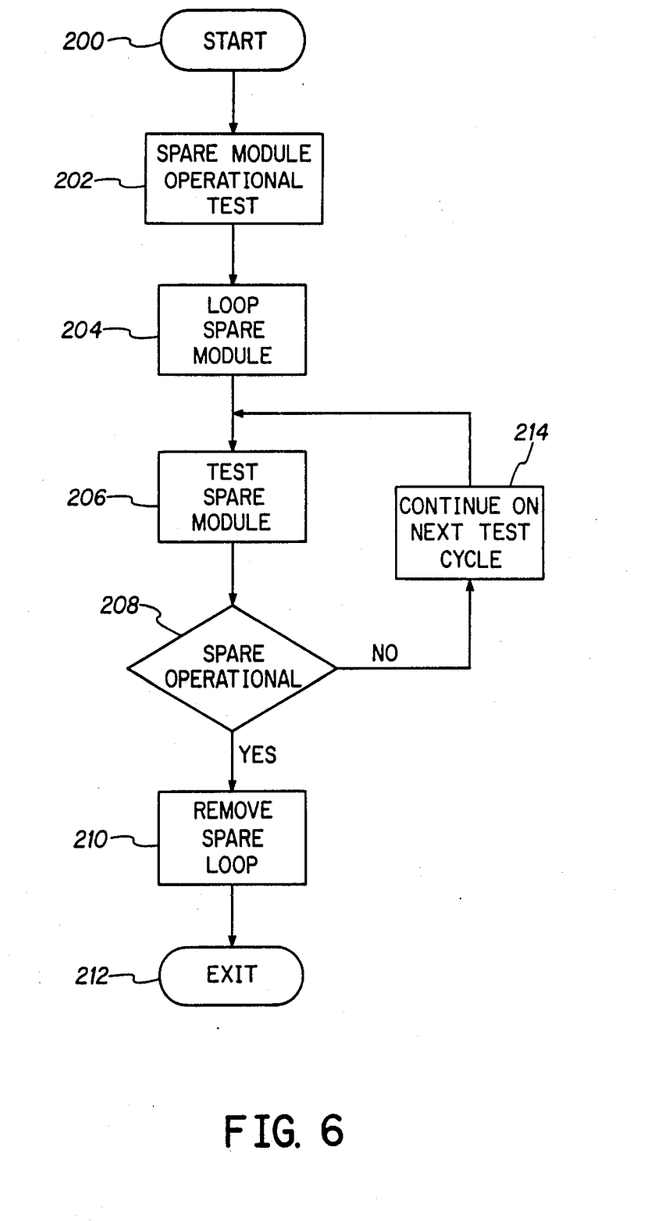
FIG. 6 is a flow diagram illustrating the test sequence for testing each spare muldem that is not presently being used.

In FIG. 6 a test sequence is illustrated for testing the spare muldems on a periodic basis. As indicated, the procedure is started in block 200 and the spare module is operationally tested in block 202. To accomplish this testing, a specific module is connected in a loopback connection as indicated in block 204 and after this is accomplished the module that is looped-back is tested, as illustrated in block 206. If the spare is operational, the decision block 208 passes the sequence to removing the loopback from the spare in block 210 and this completes the test for that spare so that the sequence is exited, as illustrated, by block 212. However, if the spare is shown not to be operational, the sequence goes to block 214 where the test sequence is held until a further periodic test operation by the circuitry associated with block 214 and the test can again be tried in block 206.

OPERATION

In view of the information presented above and in looking at FIG. 1, it will be apparent that in normal operation, data is received from the high speed 44 MBS DS3 data line by demux 24 within muldem 20 where it is manipulated in that the overhead data is removed and seven DS2 (6 megahertz) data streams are output to the various muldems such as 10 and 12. If the customer interface for that muldem requires DS1 signals, the muldem such as 10, demultiplexes this signal further into four pairs of multiplex signals for output. Likewise, muldem 10 receives four pairs of DS1 signals which it multiplexes up to DS2 frquency for transmission to the multiplex 22 of muldem 20. This signal is combined with signals in the DS2 format received from the other six muldems in the low speed group and within multiplex unit 22 is further combined with overhead bits and the composite signal is output in the DS3 format.

The master control 82 operates to continuously check the detectors utilized within the muldems to see if there is apparently a failure of one of the muldems according to its internal checking procedures. If such an indication is received by master control 82, that muldem is switched out of the operating environment and the comparable standby muldem is inserted in its place.

As illustrated in FIG. 1, the heavy lines show the data paths involved in supplying signals to the standby muldem 62 and the source of the signals involved used in testing the "failed" muldem 10 for the purpose of determining whether or not the apparent failure was due to momentary external conditions or whether the muldem 10 has actually failed. Thus, the data that had been received from the DS3 line and supplied on demux 24 rather than being routed to block 10 is routed on the standby lead 76 to block 62. It is output from 62 to the demultiplex switch 70 and passed on lead 68 to lead 14 where it is supplied to the customer as for DS1 signals. Likewise, the signals received in the DS1 format from the customer on lead 16 are routed to the multiplex switch 78 and then supplied to standby block 62 where it is multiplexed to DS2 format and supplied on lead 72 to one of the three standby inputs of multiplex unit 22. The master control 82 accomplishes this switching of signals and tells multiplex unit 22 to no longer use the multiplex signal from muldem 10 in producing the DS3 format output.

At the same time that the above is happening, the loopback connection 80 is inserted both for future testing and to disconnect or isolate muldem 10 from the customer interface. This both reduces line loading and prevents the possibility of bad data from being supplied by muldem 10 to the customer. When the system is ready to test the module 10 for operability, one of the data streams output by demux 24 is supplied on lead 74 to the demultiplexing unit within muldem 10 as well as being supplied through the multiplex unit 40 to the data select block 48 within monitor 46. The signal is passed through one of the muldems 52 and 54 to the data select 50 where it is output to elastic store 58 for temporary storage until the signal that is applied on lead 74 to the demultiplexing unit within muldem 10 has been remultiplexed within muldem 10 and supplied on lead 18 to the multiplex unit 38 and then on a line 45 to data select block 48 so that it can be output by data select 50 on the upper set of lines. At this time, the two signals are supplied to the sync and compare block 56 for comparison. If over a given amount of time, the data input to muldem 10 remains identical with that output by muldem 10, the muldem 10 is pronounced operational and the loopback 80 may be removed so that muldem 10 can return to use in place of temporarily used standby muldem 62.

FIG. 2 demonstrates the connections and the signal paths used in testing the operability of the standby units 62 through 66. As illustrated, the standby muldem 28 retrieves some of the input signals on lead 106 as input in the DS3 format to operational muldem 20. These signals are output selectively to the muldems 62 through 66 on leads 118 and the muldems are tested one at a time by comparing the signals input to the muldem as supplied to monitor 46 on lead 120 from MUX 44 with the signals output by multiplex unit 42 on lead 121. The same type of elastic storage occurs with respect to the signals supplied on lead 120 so that the sync and compare block 56 will receive the data input to and output from the appropriate standby unit simultaneously.

Figure 3:
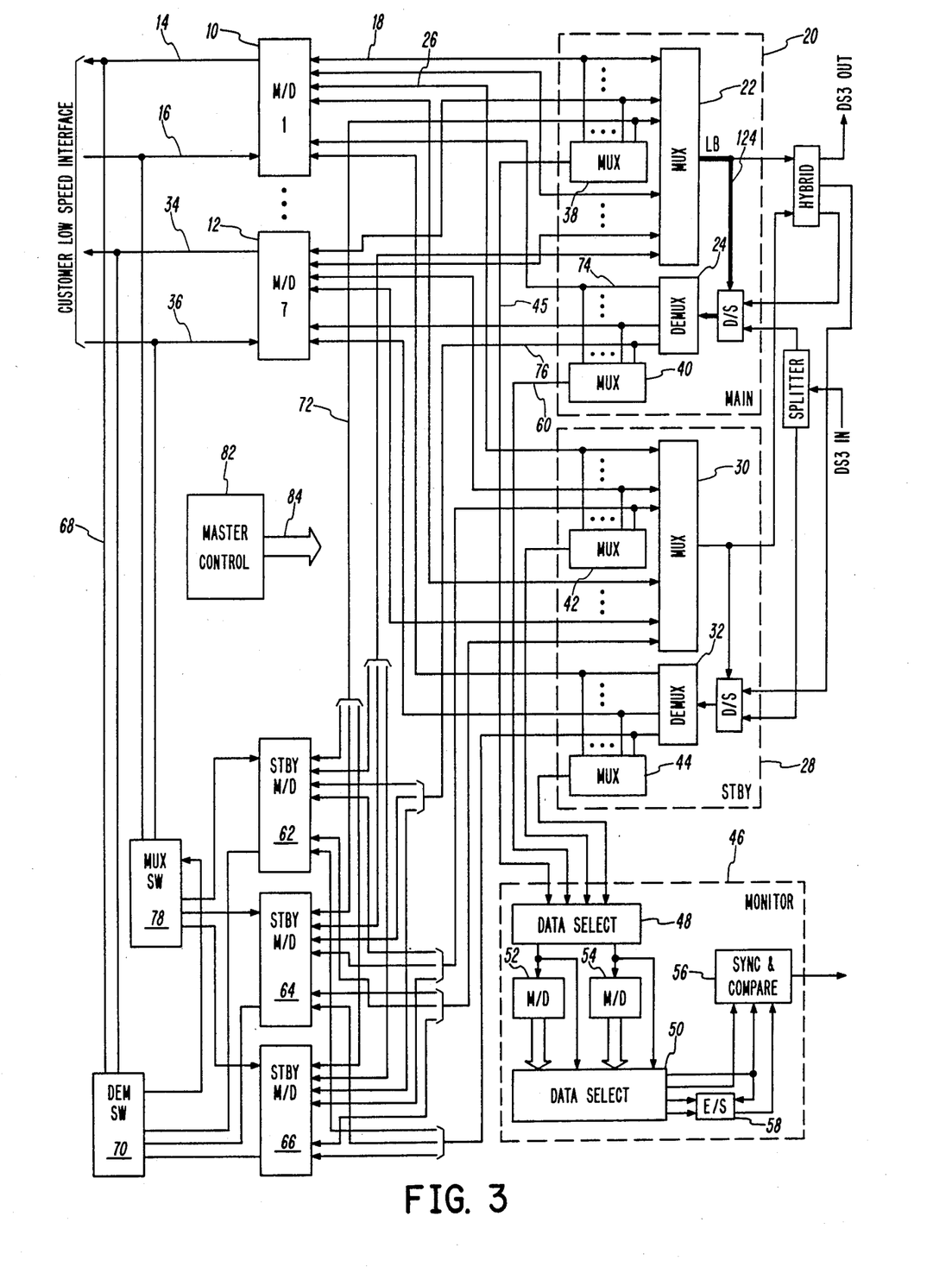
FIG. 3 is a block diagram similar to that of FIGS. 1 and 2 where the connections are illustrated for testing the high speed muldem after a switch to the high speed standby module.

FIG. 3 illustrates that the high speed muldem can also be tested using the same technique and monitoring device since the common DS2 frequency is used at all the inputs to and the outputs from the high speed muldems 20 or 28. Thus, if it be assumed that module 20 has reported an apparent failure condition and standby unit 28 has been inserted into operation, the signals from the seven muldems 10 through 12 may be also routed to multiplex unit 20 where it is looped back by loopback connection 124 and output by demux 24. The outputs of demux 24 are then concentrated by multiplex unit 40 and supplied on lead 60 to the data select 48. The signals input to multiplex unit 20 are concentrated in multiplex unit 38 and supplied on lead 45 to another input of data select 48. These signals are then passed through the appropriate muldems 52 and 54 to data select 50. When the signals are output from select block 50, the signals received on lead 45 are delayed in elastic store 58 until the corresponding bit has been received from demux unit 24 and at this time the compare block 56 compares the logic value of the two received signals.

The operation of FIG. 4 is believed obvious from the information provided in connection with the Detailed Description. However, it will be stated that the relays 134 and 144 are in their normal operational condition and upon switching provide the loopback connection with the attenuator 142 being used to reduce the amplitude of the signal to a value which would be similar to that received by the multiplexing equipment when the loopback connection is used on the low speed muldems. If the loopback is representative of loopback connection 124 in FIG. 3, the attenuator would be reducing the amplitude of the output of the multiplex unit so that the demultiplex unit has appropriate amplitude input signals.

It should be realized that for the purposes of testing as defined in the claims, the low speed units will receive input data in the loopback test mode to the demultiplex units while the high speed muldems such as 20 and 28 will receive data for loopback testing at the multiplex units. However, in each case the signal should be returned in exactly the same format and logic value as supplied if the muldem is operating correctly. It would not make any difference whether the signal were first multiplexed and then demultiplexed or first demultiplexed and then multiplexed. The recognition of this fact is the basis of a part of the present inventive concept. Another part of the present inventive concept lies in the fact that it is not necessary to generate a special test signal since the testng can be done very adequately by comparing the logic value identity of the input and output data after being looped-back. This eliminates the requirement for circuitry to build a special test signal generator. A further part of the inventive concept is the realization that pseudorandom generated test signals are not truly representative of customer data and can provide a false indication of operativeness when in fact the unit is not correctly responding to data in the format supplied by the customer. A final part of the inventive concept lies in the realization that by designing the muldem unit as a two stage operation where the signals are all initially translated to a common frequency such as DS2, and then translated to the frequency desired by the customer, a common testing point can be used and a single simple monitor can test not only the various low speed muldems designed to output signals in three different formats but can additionally test the high speed muldem using substantially identical procedures.

As used in the claims, the low speed muldems are data interface units whether they are actually changing the format from DS2 to another format or whether they are merely resynchronizing the signal between the customer frequency and the frequency required within the muldem switch illustrated.

The test sequences illustrated in FIGS. 5 and 6 would be periodically actuated for testing the spares at all times and would be actuated for testing the supposedly failed data channel as long as there was an indication that the channel is inoperative. Again, however, the testing would be on a periodic time multiplexed basis between other operations of the controller.

In summary, our invention comprises a design concept where the signals are translated from high speed DS3 transmission line frequency to customer interface frequency in two steps so that there is a common intermediate frequency whereby a single testing device can be used due to the commonality of signal formats. A second inventive concept is the realization that by looping back a muldem and comparing data supplied to the muldem with the data being recieved from the muldem on a logic value identity bit by bit basis, the muldem can be accurately checked for operability. A final inventive concept presented herein is that using the approach shown herein, the data itself can be used in the check of a muldem rather than requiring the use of separate circuitry to produce a test signal thereby eliminating the expense of designing the building such test generators.

In view of the above, we wish to be limited not by the embodiments illustrated, but only by the scope of the appended claims wherein we claim:

What is claimed is:

1. The method of checking the operability of a muldem (multiplex-demultiplex) unit comprising the steps of:
   supplying customer input data simultaneously both to a muldem to be tested for operability and to a further operational muldem for uninterrupted customer input data transmission during testing;
   looping back output signals from one-half of said muldem to an input of the other half of said muldem such that identical data is being multiplexed and demultiplexed by the muldem being tested; and
   comparing, after loopback, a predetermined number of data bits input to and output from the muldem being tested on a bit by bit basis for identical values as a check for operability of said muldem.

2. Apparatus for checking the operability of a muldem (multiplex-demultiplex) unit comprising, in combination:
   spare muldem means;
   first means for supplying customer input data to a muldem to be tested for operability;

further means for temporarily rerouting said customer input data to said spare muldem for uninterrupted transmission during testing;

second means for looping back output signals from an output portion of said muldem to an input portion of said muldem such that identical data is being multiplexed and demultiplexed by the muldem being tested; and third means for comparing a predetermined number of data bits input to and output from the muldem being tested, after loopback, on a bit by bit basis for identical values as a check for operability of said muldem.

3. The method of checking operability of individual muldem pairs in a TDM (time division multiplex) unit with a single checking device where the individual muldem pairs may have different operating frequency and data format structures as required by the transmission lines to which they are connected comprising the steps of:

directing communications channel data through both an operating muldem and to the multiplex portion of a muldem pair to be checked for operability whereby there is no interruption of data being transmitted during checking;

connecting the output of the multiplex portion of the muldem pair to be checked to the output of the demultiplex portion of said muldem pair to be checked for operability in a loopback configuration; and comparing data, as supplied to said multiplex portion of the muldem to be checked for operability with data output by the demultiplex portion of said muldem upon loopback of the data, on a bit by bit basis at a common frequency which is used by data of all communications channels while passing through the TDM unit where data input to or output from the TDM unit may be higher or lower than said common frequency.

4. Apparatus of the class described comprising, in combination:

TDM (time division multiplex) unit means, including multiple muldem (multiplex-demultiplex) units and including signal input and signal output, having at least two different transmission line multiplexing frequencies and/or data formats and at least one spare muldem for each different type of muldem in said TDM unit;

muldem interconnection switching means, all data passing through said switching means having a common frequency of operation at some point during the passage, for transmitting data between said muldems from signal input to signal output of said TDM unit means;

comparing means for comparing data on a bit by bit basis on two data streams for identity of logic value;

loopback circuit means, including control input means, connected to said signal output of the multiplex section of each muldem to be tested for operability and to the signal input of the demultiplex section of each said muldem to be tested for operability for connecting the sections in a loopback configuration in response to a control input signal applied thereto; and control means, connected to said switching means and to said loopback circuit means, for directing data from an active data channel to the multiplex section of a muldem to be tested for operability and for supplying a control signal to the loopback circuit means associated with that muldem to provide a loopback condition; and said control means being further connected to said switching means for periodically directing data to said comparing means for checking identity and thus operability of a muldem unit.

5. Test apparatus for individually testing a plurality of different muldems (multiplex-demultiplex units), incorporated in a switching system, for operability where some of the muldems have different input-output frequency parameters comprising, in combination:

high speed primary and spare muldem means for converting between high speed transmission line signals and a common frequency of operation;

low speed primary and spare muldem means for interfacing between multiple frequency low speed transmission line signals and said common frequency;

switching means, connected to said high speed and said low speed muldems, for normally connecting high speed primary muldems to low speed primary muldems in accordance with control input signals and for supplying as test output signals replicas of both signals input to and output from muldems configured in a loopback condition where the signal input to the muldem being tested is also a data signal being transmitted through operational muldems;

monitor means connected to said switching means for receiving said test output signals, said monitor means comparing said received signals bit by bit for identity as a basis for determining operability of the muldem being tested; and control means connected to said switching means and to said low and high speed muldem means for altering the path of data signals through the switch means to maintain operability of said switch means, connecting unused muldems in a loopback configured configuration periodically to operability testing, routing a data signal to a muldem being tested, and routing the data signal input to and output from the muldem being tested to said monitor means for comparison data bit testing.

6. The method of testing a plurality of different frequency signal input-output interfacing means in a multifrequency muldem for frequency translation and redistribution of signals between a single multiplexed high frequency transmission line and a plurality of lower frequency multiplexed transmission lines comprising the steps of:

converting all signals incoming to said muldem through an input-output interfacing means to a common homogeneous frequency;

connecting an input-output interfacing means to be tested for operability in a loopback configuration;

supplying a copy of switched data signal, without interrupting the flow of data through said muldem to its destination, at said homogeneous frequency to the input of one of said input-output interfacing means, which is not in active use at the time of testing, to be tested for operability; and comparing the bit values, of signals input to and output from the loopback configured input-output interfacing means to be tested, for identity as a sign of operability of said interfacing means.

7. Apparatus for testing a plurality of different frequency signal input-output interfacing means in a multi-frequency muldem for frequency translation and redistribution of signals between a single multiplexed high frequency transmission line and a plurality of lower frequency multiplexed transmission lines comprising, in combination:

a plurality of input-output interfacing first means, including signal path switching means, for converting all signals incoming to said muldem through said input-output interfacing first means to a common frequency;

control second means, connected to each of said first means, for connecting a given input-output interfacing first means, to be tested for operability, in a loopback configuration;

control third means, connected to each of said first means, for supplying a copy of a switched data signal at said common frequency to the input of one of said input-output interfacing first means, while maintaining an uninterrupted flow of said switched data signal through another input-output interfacing means of said muldem, to be tested for operability and for establishing a path for testing input and output data; and monitoring fourth means, connected to the path established by said third means, for comparing the bit values, of signals input to and output from the loopback configured input-output interfacing means to be tested, for identity as a sign of operability of said given interfacing first means.

* * * * *